May 20, 1969  R. L. THURSTON  3,444,916
NONDIRECTIONAL LOCKNUT
Original Filed April 12, 1966
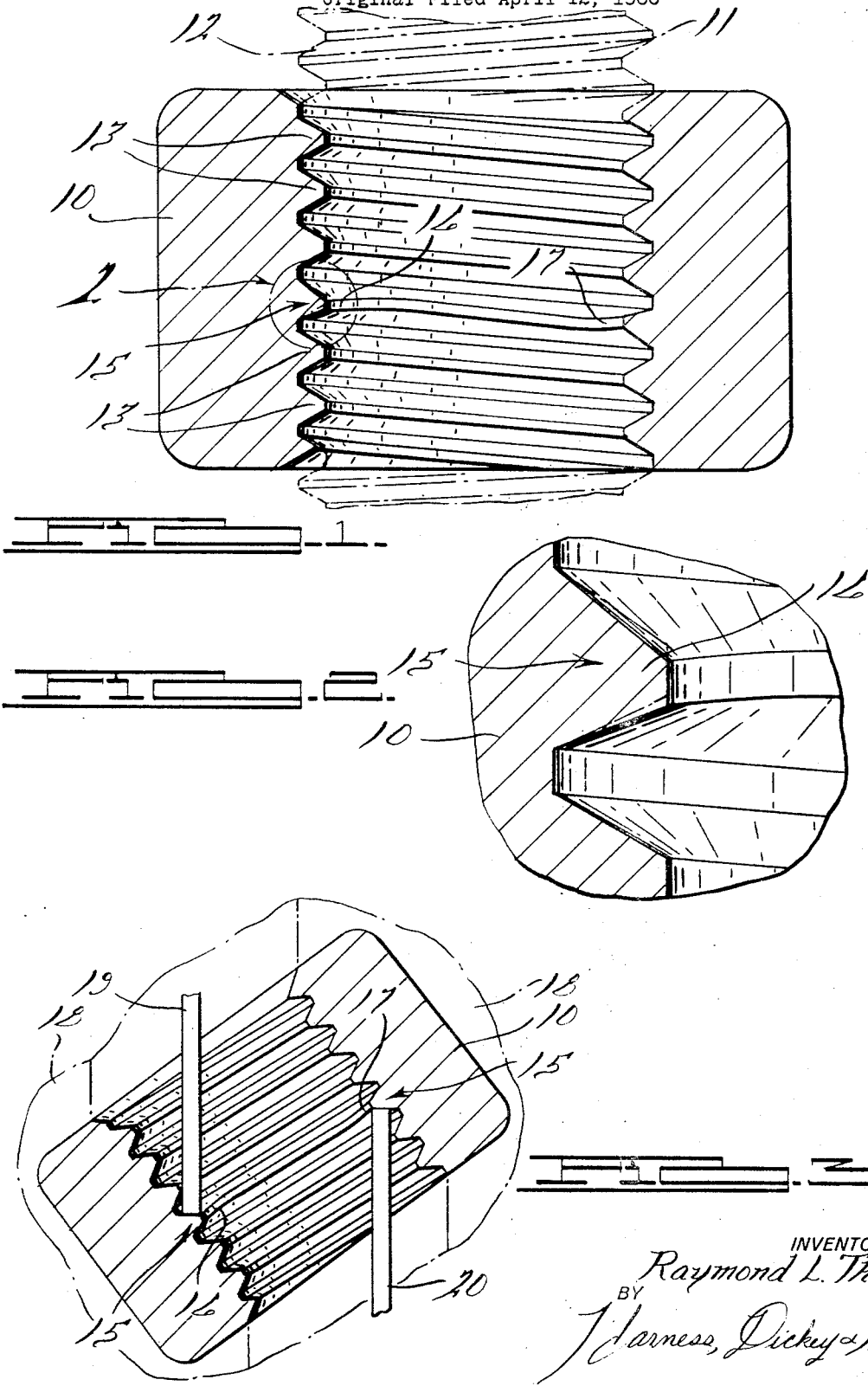
INVENTOR.
Raymond L. Thurston
BY
Harness, Dickey & Pierce
ATTORNEYS United States Patent Office 3,444,916
Patented May 20, 1969

3,444,916
NONDIRECTIONAL LOCKNUT
Raymond L. Thurston, Dearborn, Mich., assignor to Republic Industrial Corporation, New York, N.Y., a corporation of Delaware
Continuation of application Ser. No. 542,186, Apr. 12, 1966. This application Feb. 12, 1968, Ser. No. 704,953
Int. Cl. F16b 37/28; B21d 53/24
U.S. Cl. 151—22                     1 Claim

ABSTRACT OF THE DISCLOSURE

A nut having conventional internal threads at each end thereof with a pair of diametrically opposed axially deflected locking deformations intermediate the ends, whereby the nut can be assembled with a screw without regard to end for end orientation.

This application is a continuation of copending application Ser. No. 542,186 filed Apr. 12, 1966, for Nondirectional Locknut, now abandoned.

An object of this invention is to provide a nondirectional nut provided with a deflected thread midway between its ends, that applies a locking torque by the bending of the thread, to mate with frictional resistance, with the external threads of a screw or bolt member.

Another object of the invention is to provide a locknut which is nondirectional so that it may be applied to a screw or bolt from either end thereof and with either end of the nut foremost.

Another object is to provide an all-metal, nondirectional, torque-type, self-locking nut which consists of a standard threaded nut with the center thread or an intermediate thread thereof altered to provide a deflected thread to produce a spring locking action. With the entry of a threaded member, the deflected thread reacts as a stiff spring, providing a locking effect with the mating thread.

The various objects and advantages, and the novel details of construction of one commercially practical embodiment of the invention, will become more apparent as this description proceeds, especially when considered in connection with the accompanying drawings, in which:

FIGURE 1 is a sectional view of a nut constructed in accordance with this invention with a bolt or screw shown fragmentarily in dotted lines;

FIGURE 2 is an enlarged fragmentary detail view showing one of the deflected threads; and FIGURE 3 is a sectional view, partly diagrammatic, showing one method of deflecting the thread.

The reference character 10 indicates a nut constructed in accordance with this invention. This nut is adapted to be attached to a conventional screw or bolt member 11 indicated by dotted lines in FIGURE 1. The screw or bolt member 11 is provided with conventional external threads 12.

The nut member 10 is provided with standard threads 13 and the nut 10 is nondirectional so that it may be applied to the screw or bolt from either end thereof and with either nut foremost.

Arranged substantially midway between the ends of the nut 10 is a locking thread 15. One portion 16 of the locking thread is deflected downwardly as viewed in FIGURE 1 while the opposite side of this thread is deflected upwardly as indicated at 17. With the entry of a threaded member such as a bolt or screw 11 the deflected thread 15 reacts as a stiff spring, providing a locking effect with the mating thread on the bolt 11. Thus, the thread 15 applies a locking torque by the bending of the thread 15 to mate with frictional resistance with the external thread 12 of the screw or bolt member 11.

The locking thread 15 is preferably located midway between the ends of the nut to provide a locking effect centrally located from the ends of the nut. As stated, the nut is of a nondirectional nut design having a locking thread substantially midway between the ends of the nut to prevent rotation of the nut under all vibratory or torque fastening requirements.

The locking thread 15 may be prepared in any preferred or desired manner. In FIGURE 3 the nut 10 is shown as being clamped at an angle in a special fixture comprising separable clamping parts 18. The locking thread 15 is deflected as at 16 by means of a striking pin or the like 19 held against the flank of the thread form and with a force exerted by the pin 19 against the flank of the thread thereby bending the thread at this point at an angle of from 5° to 15°, usually approximately 12°, thus changing the pitch of the thread midway between the ends of the nut. The thread 15 at its opposite side is deflected upwardly as at 17 at an angle of from 5° to 15°, usually approximately 12° by a striking pin 20 causing the thread at this point to be deflected opposite to the deflection of the thread on the opposite side. Instead of using two striking tools or pins 19 and 20 the nut 10 may be turned over after the thread has been deflected as at 16 and the same tool or striking pin 19 may be used to deflect the thread as indicated at 17.

The proposed nut design has been found to be acceptable during torque installation and removal cycle testing with a nonheat treated nut. However, if the nut is heat treated it shows a more consistent torque with a closer tolerance spread on torque cycling. The proposed nut design may be lubricated with cadmium plating and a suitable wax to provide for a relatively low installation driving torque when first installed.

As will be apparent from the foregoing description, the objects and advantages of this invention are attained by a construction which is so reduced in the number and character of its component parts as to approach the ultimate in structural simplicity. The simplicity of the device creates an economy in its manufacture, and maintenance costs.

While one commercially practical embodiment of the invention has been described and illustrated herein somewhat in detail, it will be understood that various changes may be made.

I claim:
1. A one piece self-locking nut for engagement with a conventional screw,
said nut comprising a member having an aperture extending entirely therethrough,
said aperture having a standard internal integrally formed thread at the opposite ends thereof to facilitate engagement with the screw independently of nut orientation,
and a pair of locking deformations on said thread intermediate and spaced from the ends thereof,
said locking deformations comprising diametrically opposed thread portions of relatively short circumferential length deflected beyond their elastic limit axially of the aperture in opposite directions, respectively, toward an adjacent standard convolution so as to mate with frictional resistance with the external thread of the screw upon advancement thereof from either end of said nut, said locking deformations being separated from each other solely by undeformed standard thread portions.

References Cited

UNITED STATES PATENTS

| | | | |
|---|---|---|---|
| 1,070,247 | 8/1913 | Haines | 151—22 |
| 1,250,748 | 12/1917 | Woodward | 151—22 |
| 3,029,856 | 4/1962 | Abbott. | |

FOREIGN PATENTS

| | | |
|---|---|---|
| 1,186,278 | 1/1965 | Germany. |
| 10,396 | 8/1886 | Great Britain. |

CARL W. TOMLIN, *Primary Examiner.*

R. S. BRITTS, *Assistant Examiner.*

U.S. Cl. X.R.

10—86

UNITED STATES PATENT OFFICE
CERTIFICATE OF CORRECTION

Patent No. 3,444,916                                                   May 20, 1969

Raymond L. Thurston

It is certified that error appears in the above identified patent and that said Letters Patent are hereby corrected as shown below:

Column 4, line 3, "10,396    8/1886" should read -- 533,761    2/1941 --.

Signed and sealed this 14th day of April 1970.

(SEAL)
Attest:

Edward M. Fletcher, Jr.                                WILLIAM E. SCHUYLER, JR.
Attesting Officer                                                Commissioner of Patents